April 3, 1951     S. A. WILSON     2,547,190

OIL AND GAS SEPARATOR

Filed Jan. 23, 1946     2 Sheets-Sheet 1

INVENTOR.
SAMUEL A. WILSON
BY
C. M. McKnight

April 3, 1951 S. A. WILSON 2,547,190
OIL AND GAS SEPARATOR

Filed Jan. 23, 1946 2 Sheets-Sheet 2

INVENTOR.
SAMUEL A. WILSON
BY
C. M. McKnight

UNITED STATES PATENT OFFICE 2,547,190

OIL AND GAS SEPARATOR

Samuel A. Wilson, Shreveport, La., assignor to Maloney-Crawford Tank and Manufacturing Company, Tulsa, Okla., a corporation of Delaware Application January 23, 1946, Serial No. 642,966

7 Claims. (Cl. 183—2.7)

This invention relates to improvements in separators and more particularly, but not by way of limitation, to an oil and gas separator adapted to separate the crude mixture coming directly from the oil well.

In the oil field practice of separating the oil and gas coming from the well, the mixture delivered to the separator usually contains considerable amounts of abrasive material such as sand and the like, which tends to wear the inner lining of the separator shell. To overcome this detriment, the present day separators have utilized inlet nozzles or diverters, common among which are the radial inlet nozzles for discharging the mixture directly into the shell from the vertical wall thereof. Likewise, the tangential type of inlet nozzle has been utilized to provide a centrifugal whirling motion to the influent mixture in order to provide an initial separation by scrubbing against the inner wall of the separator shell.

This invention contemplates a novel construction in an oil and gas separator by the use of a combined radial and tangential type of inlet nozzle extending internally into the separator chamber so as to prevent any abrupt turning of the discharged influent mixture until it is well within the separator shell thereby substantially eliminating sand cuting of the shell linings at the inlet nozzle. Furthermore, this invention utilizes a mist extractor section cooperating with the inlet nozzle for additionally separating the influent mixture wherein the lighter gaseous mixture is discharged into the center section of the separator to provide a longer interval of time for the wet gases in the mid-section of the separator shell so that a drier gas will be admitted into the mist extractor section.

It is an important object of this invention to provide an improved oil and gas separator so constructed to cause the gas to automatically and efficiently release entrained oil globules as well fluids are discharged into the separator shell.

A further object of this invention is to provide an oil and gas separator utilizing a combined radial and tangential inlet nozzle extending internally of the separator, so that the influent mixture is initially separated and discharged thereunto in a thin vertical whirling stream. Furthermore, the curvature of the nozzle is such as to discharge the influent stream on a gradually increasing radius to provide a more efficient separation of the influent mixture by centrifugal scrubbing.

And still another object of this invention is to provide an improved oil and gas separator utilizing a novel diverter arrangement which prevents a congestion of the influent mixture upon discharge into the separator shell, and initial separation from the diverter immediately causes an upward flow of the gases simultaneous with a downward flow of the oil mixture.

And still another object of this invention is to provide an improved oil and gas separator utilizing a novel inlet diverter so that the influent mixture discharging therefrom is directed in a centrifugal path thus allowing the lighter and drier gases of the influent mixture to be separated and directed toward a center section of a concentric mist extractor unit, so that the wet portion of the gases remain in the separator through a longer interval of time and provide a more efficient separation.

And still another object of this invention is to provide a mist extractor section for an oil and gas separator which is constructed with two separate drains thereby equalizing the separator compartments of the mist extractor unit in order to minimize the pressure drop therethrough. Furthermore, the construction of the mist extractor precludes any unnecessary restrictions thereby assisting in minimizing the pressure drop of the gaseous mixture passing therethrough.

Another object of this invention is to provide an oil and gas separator construction which utilizes a serrated baffle for receiving the separated oil dropping by gravity, so that the serrations will aid in releasing any gas in the oil mixture before it reaches a quieting chamber in the shell.

With the foregoing object outlined and with other objects in view which will appear as the description proceeds, the invention consists in the novel features hereinafter described in detail, illustrated in the accompanying drawings, and more particularly pointed out in the appended claims.

Figure 1:
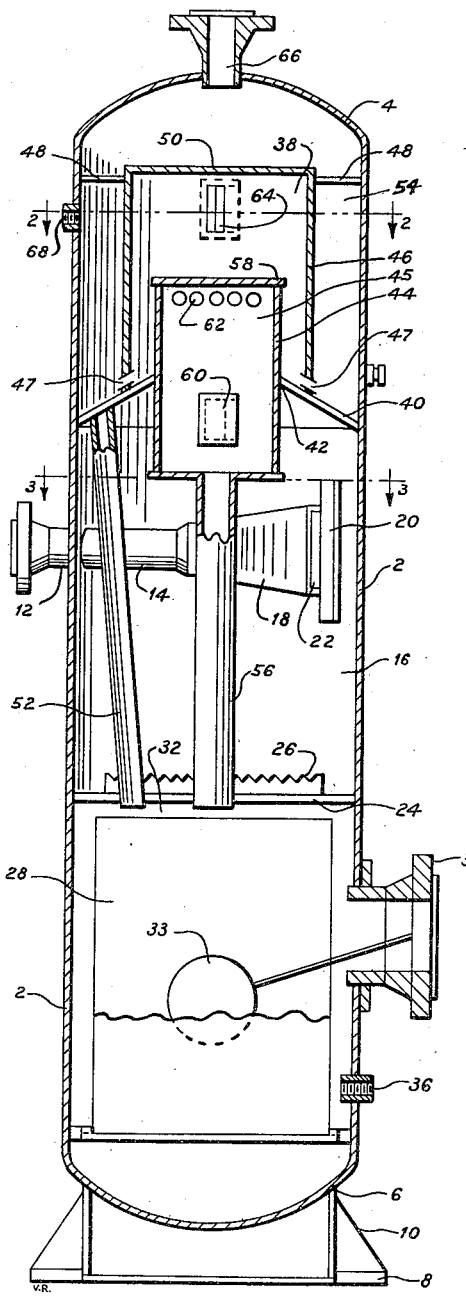
Fig. 1 is a vertical sectional view of the preferred embodiment of the oil and gas separator constructed in accordance with this invention.
Figure 2:
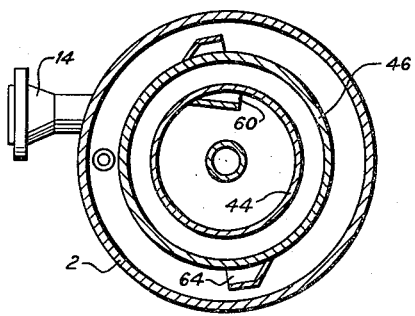
Fig. 2 is a horizontal cross-sectional view taken on lines 2—2 of Fig. 1.
Figure 3:
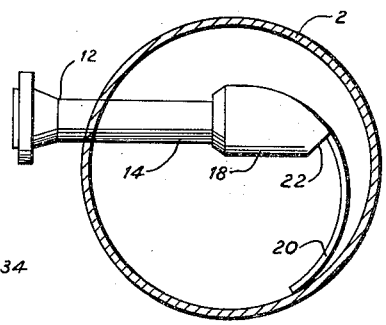
Fig. 3 is a horizontal cross-sectional view taken on lines 3—3 of Fig. 1.

Referring to the drawings in detail and more particularly Figs. 1 to 3, reference character 2 designates an elongated vertical tank having a cover 4 and a dished bottom element 6, all supported on a base 8. The base 8 is provided with a plurality of circumferentially spaced strengthening ribs 10. The shell 2 is provided with an aperture 12 intermediate its ends for receiving an inlet pipe 14 extending through the aperture 12 and transversely into the center of the shell chamber 16. The inlet pipe 14 is constructed with an inlet nozzle or diverter 18 having a curved wing or deflector plate 20 depending therefrom. A discharge opening 22 is provided for the nozzle and is constructed to provide a narrow rectangular opening 22 disposed vertically of the tank. The depending plate 20 is disposed substantially tangential to the cylindrical wall of the tank. However, the curvature of the plate 20 is constructed on a gradually increasing radius (Fig. 3) for a purpose as will be hereinafter set forth.

The radial inlet pipe 14 combined with the narrow nozzle opening 22 and curved plate 20 provides a flared construction which will cause an initial separation of the influent mixture wherein the gases will separate in the upper half of the nozzle 18 and the oil will separate into the lower half due to the action of gravity. With a substantial portion of the separation taking place in the diverter 18, the influent mixture is discharged from the narrow opening 22 in a thin vertical film where the tangentially disposed plate 20 directs the lighter gases emitting from the nozzle opening 22 in a centrifugal path around the inner walls of the separator tank 2. The lighter gases are then directed upwardly through the chamber 16 into the mist extractor unit as will be hereinafter referred to. The oil being heavier than the gas and the opening 22 being vertically elongated, it will be obvious that due to the action of gravity the oil will tend to separate and be directed in a downward helical path against the tank interior thereby completing the initial separation of the influent mixture.

A horizontal baffle 24 is anchored to the inner wall of the tank at a position below the inlet nozzle 18. The baffle 24 is provided on one edge with a plurality of upstanding serrations 26 for a purpose as will be hereinafter set forth. A vertically disposed baffle 28 is secured in the shell chamber 16 below the baffle 24. The baffle 28 and serrated edge 26 are in spaced arrangement from an inner wall portion of the tank 2 to provide a chamber 30 for the passage of the separated oil from the baffle 24 into a quieting chamber 32 as will be hereinafter set forth. The shell 2 is provided with a float actuated control valve 34 adapted to cooperate with an outlet control valve (not shown) which may be arranged in the oil outlet 36. These parts are more or less of known construction and simply have been illustrated to show a workable embodiment of the invention.

A mist extractor unit 38 is disposed in the upper portion of the shell chamber 16 and comprises a substantially conical baffle 40 secured circumferentially to the inner periphery of the tank 2. The baffle 40 is apertured at 42 through which extends a vertically disposed cylinder 44. The cylinder 44 may be secured by welding or the like, to the peripheral edges of the aperture 42 of the baffle 40. A separating shell 46 is arranged in spaced relation to the shell 44 and extends vertically upward from the baffle 40 to be anchored by a plurality of circumferentially spaced brackets 48 secured to the inner wall of the tank 2. The shell 46 is provided with a cover or plate 50 for a purpose as will be hereinafter set forth.

A drain pipe 52 extends downward from the baffle 40 to provide communication between an upper chamber 54 and the lower chamber 32. The shell 44 is provided with an additional drain pipe 56 providing communication between the interior of the shell 44 and chamber 32. The shell 44 is provided with a cover plate 58.

Referring to Fig. 2, the inner cylinder 44 is provided with an inlet louver 60 arranged near the lowermost portion thereof. A plurality of circumferentially spaced apertures 62 are arranged in the topmost portion thereof. The shell 46 is provided with a plurality of outlet louvers 64 as will be hereinafter set forth. A gas outlet 66 is provided in the cover 4 and communicates with a discharge pipe (not shown). The tank 2 is provided with an aperture 68 for receiving a pressure relief valve (not shown).

Figure 4:
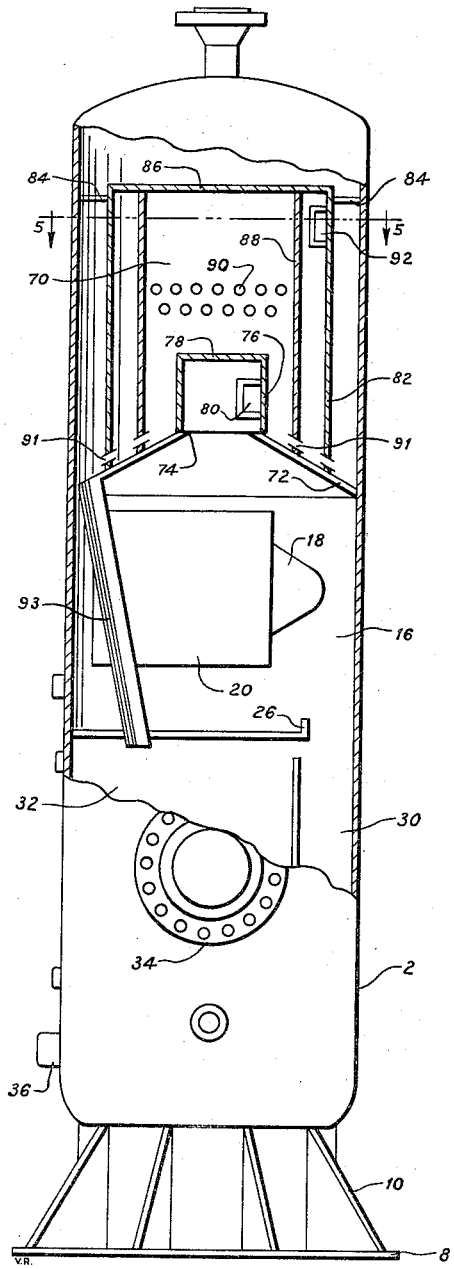
Fig. 4 is a vertical elevational view with certain parts broken away and showing a modified construction of the mist extractor unit in section.
Figure 5:
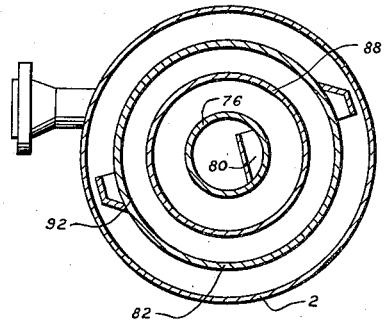
Fig. 5 is a horizontal cross-sectional view taken on lines 5—5 of Fig. 4.

Referring now to Figs. 4 and 5 showing a modified mist extractor unit, the separator is constructed in the same manner as the preferred embodiment in that it utilizes the identical inlet nozzle and lower quieting chamber. A modified mist extractor unit 70 is arranged in the upper portion of the tank 2 and comprises a substantially conical baffle 72 secured circumferentially to the inner wall of the tank. The baffle is provided with a centrally disposed aperture 74. A cylindrical shell 76 is secured to the periphery of the aperture 74 and extends vertically upwardly therefrom and into the chamber 16. The shell 76 is provided with a cover plate 78 and an inlet louver 80. A separating cylinder 82 is secured at its lowermost portion to the baffle 72 and extends vertically upward in spaced relation to the shell 76. A plurality of the circumferentially spaced brackets 84 secure the upper portion of cylinder 82 to the inner wall of the tank 2 at a point near the topmost portion thereof. The cylinder 82 is provided with a cover 86. An intermediate cylinder 88 is arranged in spaced relation between the shell 76 and the outer cylinder 82. The intermediate cylinder 88 is secured between the baffle 72 and the cover plate 86 and is provided with a plurality of circumferentially spaced apertures 90 for a purpose which will be hereinafter set forth. The outer cylinder 82 is provided with a plurality of outlet louvers 92.

In operation the influent stream of oil and gas from the well enters the separator through the inlet pipe 14 where it is spread in the nozzle 18 and discharged from the nozzle opening 22 in a smooth thin vertical film and whirled by the curved plate 20 helically and scrubbed against the inner wall of the tank 2. Reiterating the flared construction of the nozzle and curved plate initially separates a substantial portion of the influent mixture in the diverter so that the lighter gaseous fluids will be directed in an upward helical path, simultaneous with the oil being directed downwardly in a helical path. The oil falls through force of gravity onto the horizontal baffle 24 and flows over the serrated baffle edge 26 to effect a release of any gas which may be in solution in the oil. The oil is then discharged into the chamber 30 to be directed under the baffle 28 into the quieting chamber 32, until such time the float 33 actuates the float control valve 34 which will in turn cause a discharge of the oil from the quieting chamber 32.

The serrations on the horizontal baffle in materially aiding the release of any gas which may be in solution in the oil are very important. For an efficient separation of oil and gas, the main object is to deliver a gas free oil to the oil outlet, since any gas in solution with the oil delivered to the stock tanks would be released due to a reduction in pressure thereby causing a carrying off of the heavy ends of the oil from the stock tank vents with a resulting loss in volume and gravity.

The lighter gaseous constituents of the influent mixture, after the initial separation in the nozzle 18, are directed in an upward helical path by the deflector plate 20 for a centrifugal scrubbing against the walls of the tank. The gases rising toward the mist extractor will impinge against the lower face of the baffle 40 and move toward the inlet louver 60 of the shell 44. It will be apparent that the lighter gases passing from the plate 20 to the louver 60 are partially disposed in the center of the chamber 16 which has the advantage of allowing the wet portion of the gas to remain in the chamber a little longer and thereby provide a better separation. The lighter gases passing through the louver 60 are directed tangentially into the chamber 45 for a further scrubbing action against the inner wall of cylinder 44. The jet construction of the louvers momentarily speeds up the velocity of the rising lighter fluids which are then slowed down as they are centrifugally whirled around in the cylinder 44. Any entrained oil globules scrubbed out in this action are allowed to flow down the drain pipe 56 to be discharged into the quieting chamber 32. The lighter vapors continue upwardly to impinge against the top cover 58, providing a further separation whereupon they are discharged through the spaced apertures 62 and hence into a straight horizontal path against the inner wall of the cylinder 46. A further separation is effected due to the scrubbing against the wall of cylinder 46 wherein the heavier constituents fall downward against the baffle 40 and pass through the apertures 47 provided in the lowermost portion of the shell 46, and into the drain pipe 52. The separated lighter constituents are now permitted to rise within the cylinder 46 and impinge against the cover plate 50 and then directed through the outlet louvers 64 into the space 54 for discharge from the outlet 66.

The modification in Figs. 4 and 5 operates in substantially the same manner as the preferred embodiment except the mist extractor unit 70 receives the upwardly rising gases through the louver 80 of the shell 76. In this manner the gases are provided with a slightly longer travel in the chamber 16 so as to provide a lighter and drier gas flowing into the extractor unit. From the louver 80 the gases are centrifugally scrubbed against the inner wall of the cylinder 88 and the heavier oil globules pass through apertures 89 and 91 to the drain pipe 93 communicating with the lower chamber 32. The lighter mixture then passes through the apertures 90 to be further scrubbed against the inner wall of the outer cylinder 82 whence they are then discharged through the outlet louvers 92 of the cylinder 82. Any oil that is freed in this last operation is allowed to flow through the drain pipe to chamber 32. The free gases are permitted to continue their rise upward and discharged out the gas outlet 66.

From the foregoing it will be apparent that this invention provides a novel inlet louver construction which discharges the influent mixture well into the tank chamber and thereby allow free vertical movement of the lighter gaseous stream as well as the oil liquid stream downward without any interference from the high velocity influent stream. Furthemore, the nozzle construction with its deflector plate is such to direct the influent mixture in a helical path to take full advantage of centrifugal scrubbing against the inner walls of the tank, as well as direct the lighter gases upwardly from the mid-section of the tank to be further separated in the mist extractor. Furthermore, the separation in the mist extractor is accomplished without any substantial drop in pressure of the rising mixture. The downward descending oil is deposited on a horizontal baffle having serrated edges to aid in additionally separating entrained gases that may be in the oil and assure substantially gas free oil for discharge from the tank.

Changes may be made in the details of the invention disclosed herein, without departing from the spirit of the invention, as expressed in the following claims.

I claim:

1. In an oil and gas separator comprising a vertical tank, fluid inlet means extending through the sides of the tank and comprising an inlet pipe extending substantially transversely into the interior thereof, a flared nozzle cooperating with the pipe to provide a narrow vertical opening for effecting initial separation of the influent mixture, a plate extending from the nozzle on a gradually increasing radius for directing the separated influent mixture in a helical path within the tank, a horizontal baffle disposed in the lower portion of the tank for receiving the fluid therefrom, a serrated projection provided on one edge of the baffle, said edge being spaced from the inner surface of the tank, a vertical baffle arranged below the serrated edge of the horizontal baffle to provide a lower chamber for receiving fluid discharging over the serrated projection, a mist extractor unit arranged in the upper portion of the tank for separating fluids entering the extractor unit from the tank and outlet means for the separated fluids.

2. In an oil and gas separator comprising a vertical tank, having a liquid settling chamber in the lower portion thereof, fluid inlet means extending through the tank and transversely into the interior thereof, said inlet means comprising a flared nozzle of substantially rectangular vertical cross-section to provide a narrow vertical opening for effecting the initial separation of the influent mixture, a curved plate extending from the nozzle and disposed substantially tangential to the inner periphery of the tank for directing the separated influent mixture in a helical path within the tank, a conical baffle having a central aperture arranged in the upper portion of the tank, a shell closed at its top and extending through the apertured baffle, an outer cylinder arranged in spaced relation to the shell and extending upwardly from the baffle, a cover for the cylinder, an inlet louver for the shell directing the upwardly rising gases helically thereinto, a drain pipe providing communication between the shell and the lower settling chamber, a plurality of outlet apertures for discharging the scrubbed gases from the shell and into a chamber between the shell and the cylinder, an outlet louver for the cylinder, drain means extending from the conical baffle to the lowermost settling chamber for discharging the scrubbed liquid thereinto and outlet means for the separated fluids.

3. In an oil and gas separator comprising a vertical tank, a fluid inlet pipe extending through the sides of the tank and transversely into the interior thereof, a flared nozzle cooperating with the inlet pipe to provide a narrow vertical opening for effecting initial separation of the oil and gas, a curved plate extending from the nozzle on a gradually increasing radius for directing the separated oil and gas in a helical path against the inner walls of the tank, an apertured baffle disposed within the upper portion of the tank, a cylinder having closed end portions extending through the apertured baffle and comprising a jet inlet for receiving the fluid entering the cylinder from the tank, a separating cylinder transversely spaced from the first mentioned cylinder and disposed above the baffle, means pro-communication between the cylinders for discharge of gases therethrough, a cover plate for the separating cylinder, an outlet louver for discharging the fluids from the separating cylinder, a horizontal baffle disposed in the lower portion of the tank for receiving the fluid therefrom, an upstanding projection having serrations provided on one edge of the horizontal baffle, a vertical baffle arranged below the horizontal baffle to provide a lower chamber for receiving the fluid discharging over the serrated projection, a drain pipe extending from the first mentioned cylinder to provide communication with the lower chamber, a second drain pipe extending from the apertured baffle into communication with the lower chamber, a gas escape pipe leading from the upper portion of the tank, an oil outlet leading from the lower portion of the tank.

4. In an oil and gas separator comprising a vertical tank, fluid inlet means extending through the sides of the tank and comprising an inlet pipe extending transversely into the interior thereof, a flared nozzle cooperating with the pipe to provide a narrow vertical opening for effecting initial separation of the influent mixture, a plate extending from the nozzle on a gradually increasing radius for directing the separated influent mixture in a helical path within the tank, a horizontal baffle disposed in the lower portion of the tank for receiving the fluid therefrom, a serrated projection provided on one edge of the baffle, said edge being spaced from the inner surface of the tank, a vertical baffle arranged below the serrated edge of the horizontal baffle to provide a lower chamber for receiving fluid discharging over the serrated projection, a conical baffle arranged in the upper portion of the tank and having a cylinder extending upwardly therefrom, said cylinder having closed top portion, an inlet louver for directing upwardly rising gases therethrough, a second cylinder transversely spaced from the first mentioned cylinder and disposed above the baffle, means providing communication between the cylinders for allowing discharge of the gases therethrough, and outlet means for discharging the gases into the upper-most portion of the tank and outlet means for the separated fluids.

5. In an oil and gas separator comprising a vertical tank, fluid inlet means extending through the sides of the tank and comprising an inlet pipe extending transversely into the interior thereof, a flared nozzle cooperating with the pipe to provide a narrow vertical opening for effecting initial separation of the influent mixture, a plate extending from the nozzle on a gradually increasing radius for directing the separated influent mixture in a helical path within the tank, a conical baffle having a central aperture arranged in the upper portion of the tank, a shell closed at its top and extending through the apertured baffle, an outer cylinder arranged in spaced relation to the shell and extending upwardly from the baffle, a cover for the cylinder, an inlet louvre for the shell directing the upwardly rising gases from the nozzle helically thereinto, a lower settling chamber in communication with a chamber above the baffle and outlet means for the separated fluids.

6. In an oil and gas separator comprising a vertical tank, fluid inlet means extending through the sides of the tank and comprising an inlet pipe extending transversely into the interior thereof, a flared nozzle cooperating with the pipe to provide a narrow vertical opening for effecting initial separation of the influent mixture, a plate extending from the nozzle on a gradually increasing radius for directing the separated influent mixture in a helical path within the tank, a mist extractor unit arranged in the upper portion of the tank for separating fluids entering the extractor unit from the flared nozzle, and a lower settling chamber communicating with the mist extractor unit and outlet means for the separated fluids.

7. In an oil and gas separator comprising a vertical tank, fluid inlet means extending through the sides of the tank and comprising an inlet pipe extending substantially transversely across the interior thereof, a flared nozzle cooperating with the pipe to provide a narrow opening of substantially rectangular vertical cross-section for effecting initial separation of the influent mixture, a curved blade extending from the nozzle and disposed substantially tangential to the periphery of the tank and directing the initial separation of the influent mixture in a helical path within the tank, and outlet means for the separated influent mixture.

SAMUEL A. WILSON.

REFERENCES CITED

The following references are of record in the file of this patent:

UNITED STATES PATENTS

| Number | Name | Date |
|---|---|---|
| 1,654,261 | Jones | Dec. 27, 1927 |
| 1,789,612 | Walker | Jan. 20, 1931 |
| 2,001,851 | Riley | May 21, 1935 |
| 2,016,641 | Lincoln | Oct. 8, 1935 |
| 2,181,686 | Walker | Nov. 28, 1939 |
| 2,295,101 | Dunham | Sept. 8, 1942 |